United States Patent
Holoch et al.

(10) Patent No.: US 10,782,709 B2
(45) Date of Patent: Sep. 22, 2020

(54) ELECTRONIC FLOW CONTROLLER

(71) Applicant: BELIMO HOLDING AG, Hinwil (CH)

(72) Inventors: Philip Holoch, Neschwil (CH); Reto Hobi, St. Gallenkappel (CH)

(73) Assignee: BELIMO HOLDING AG, Hinwil (CH)

( * ) Notice: Subject to any disclaimer, the term of this patent is extended or adjusted under 35 U.S.C. 154(b) by 2 days.

(21) Appl. No.: 15/759,663

(22) PCT Filed: Sep. 8, 2016

(86) PCT No.: PCT/EP2016/071230
§ 371 (c)(1),
(2) Date: Mar. 13, 2018

(87) PCT Pub. No.: WO2017/050588
PCT Pub. Date: Mar. 30, 2017

(65) Prior Publication Data
US 2019/0041878 A1     Feb. 7, 2019

(30) Foreign Application Priority Data
Sep. 22, 2015   (CH) ...................................... 1375/15

(51) Int. Cl.
*G05D 7/06*     (2006.01)
*G01F 1/00*     (2006.01)

(52) U.S. Cl.
CPC ............. *G05D 7/0635* (2013.01); *G01F 1/00* (2013.01)

(58) Field of Classification Search
CPC ................................ G05D 7/0635; G01F 1/00
See application file for complete search history.

(56) References Cited

U.S. PATENT DOCUMENTS 9,928,724 B2 * 3/2018 Alcorn ...................... G01F 1/34
10,295,387 B2 * 5/2019 Bonomi ................ F16K 27/067
(Continued)

FOREIGN PATENT DOCUMENTS

DE         100 47 383 C1      11/2001

OTHER PUBLICATIONS

Communication dated Sep. 22, 2015 from the Swiss Federal Institute of Intellectual Property in counterpart application No. 13752015.
(Continued)

*Primary Examiner* — Eric Keasel
(74) *Attorney, Agent, or Firm* — Sughrue Mion, PLLC (57) ABSTRACT

The invention relates to an electronic flow controller (30) for applications in the HVAC field, said electronic flow controller comprising a one-piece valve body (31) which is penetrated by a flowing medium. The valve body is divided into a valve portion (31a) and a flow measurement portion (31b) along the flow direction, wherein a valve element (32) is arranged in the valve section (31a) for the control of flow, wherein said valve element can be controlled from the outside via a valve spindle (33), and wherein a measurement path (36) is formed in the flow measurement portion (31b) for determining the flow rate by means of ultrasound. In order to achieve a compact arrangement and a greatly simplified assembly, accesses (34a, b) for coupling and/or outcoupling ultrasound into or from the measuring path (36) are formed on the valve body (31) in the region of the flow measurement portion (31b). A control unit (62) is placed on the valve body (31), which comprises first means (27, 28) for actuating the valve element (32), said first means being in engagement with the valve spindle (33), and second means (29a, b) for emitting and/or receiving ultrasound signals which are acoustically coupled to the accesses (34a, b) for coupling and/or outcoupling ultrasound.

18 Claims, 6 Drawing Sheets

(56) References Cited

U.S. PATENT DOCUMENTS

2008/0294293 A1    11/2008  Yamamoto
2017/0152648 A1*  6/2017  Hammond .............. G01F 1/667

OTHER PUBLICATIONS

Belimo Americas: "Belimo Energy Valve", Aug. 13, 2015, XP055241249, Accessed via internet, URL: https://web.archive.org/web/20150813120227/http://energyvalve.com/product-doc.html. (4 pages total).

Belimo Americas: "Latest Updates", May 3, 2015, XP055241263, Accessed via internet, URL: https://web.archive.org/web/20150503074923/http://www.belimo.us/americas/latest.html. (6 pages total).

* cited by examiner

ELECTRONIC FLOW CONTROLLER

TECHNICAL FIELD

The present invention relates to the field of flow controllers. It relates to an electronic flow controller for applications in the HVAC field in accordance with the preamble of claim 1.

PRIOR ART

In applications in particular in the field of HVAC (heating, ventilation, air conditioning) pressure-independent control ball valves are frequently used. Such control ball valves, such as those offered by the applicant designated by PICCV (Pressure Independent Characterized Control Valve), contain a ball valve that can be adjusted from the outside and an internal mechanical flow controller, which hold the flow rates that are set largely constant under varying pressures (see, for example, WO 01/13017A2).

In addition to the mechanically controlled valves, in recent times electronically controlled variants have also become available, which are offered by the applicant under the name EPIV (Electronic Pressure Independent Valve). Here, a valve adjustable via a motorized actuator via a flange and screw connection is coupled to a mounting part, through which the current to be controlled flows and which contains, for example, a measuring device operating mechanically, with pressure differences, with ultrasound or by magnetic induction for determining the flow velocity (see, for example, US 2015/057816 A1).

The electronically controlled EPIV is a further development of the pressure-independent control valve PICCV. Because it combines four functions—measuring, regulating, balancing and shutting off—in one fitting (in another version with additional billing and recording, there are even 6 functions), the valve design is considerably simpler. In addition, the effort required for the hydraulic balancing in an HVAC system is significantly reduced. However, the assembly of the device from a valve part and a separate flow measurement part and the subsequent wiring of the parts to a central processing and control unit is relatively time-consuming. In addition, it cannot be guaranteed that the components used are always matched to one another.

Figure 1:
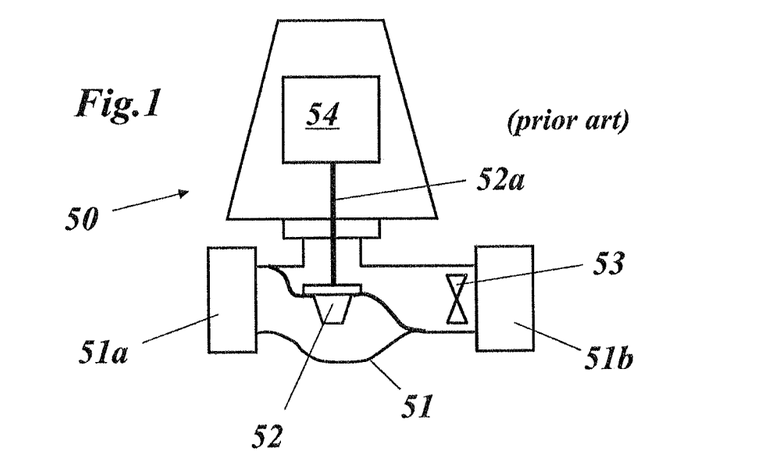
FIG. 1 a diagram of a first electronically controlled valve according to the prior art.

Document WO 98/25086 A1 discloses a modulating control device for a flow medium for a flow medium-based heating and cooling system for a measurement environment, which is characterised in that the flow measurement means is arranged in the valve body and the valve control device is programmed with a maximum flow medium flow rate through the valve and responds to the feedback signal from the flow measurement means, in order to limit an extent of the flow rate of the flow medium through the system for the purpose of flow medium balancing by limiting the position of the valve by means of the programmed maximum flow rate of the flow medium. FIG. 1 shows an exemplary embodiment of such a control device.

The previously known control valve 50 has a one-piece valve body 51, which is fitted with two end-side connecting flanges 51a and 51b for insertion into a pipe. The flow of the medium through the control valve 50 is determined by a centrally arranged opening, whose opening cross-section can be varied by means of a movable valve element 52. The controlling or regulating movement of the valve element 52 is effected by way of an actuating shaft 52a inserted into the valve body 51 by means of a motor 54. The flow of the medium through the control valve 50 is received by means of a (not specified in detail, but probably mechanical) flow measuring device 53, the signals of which are fed via a pipe (not shown) to a remotely located central controller. This controller also controls the motor 54, so that a control loop is formed incorporating a centralised control system.

This known control valve provided for HVAC applications, is on the one hand compact in its design. On the other hand, it has the disadvantage that both the measuring device (53) and the regulating device (52, 52a, 54) must be separately wired to a remote control unit, which is costly and error-prone. In addition, the mechanical flow measuring device using an impeller or similar device is fault-prone, inaccurate and has a limited measuring range.

Furthermore, in document US 2012/0090702 A1 a simplified combination of a membrane-controlled shut-off valve and an integrated water meter have been proposed for applications in the field of agriculture (irrigation systems). The water meter comprises a hollow body with an inlet and an outlet for the water and a through passage, which connects the inlet and outlet. Integrated into the body and oriented at an angle to the flow direction is an ultrasonic measuring path, which is equipped at the ends with an ultrasound transmitter and ultrasound receiver. The water meter is operated using a local battery by a set of electronics mounted on the body of the water meter, while the shut-off valve is pressure-controlled by a remote valve.

This known arrangement is not intended or designed for a continuous flow regulation process. The ultrasonic measuring path is located very close to the shut-off valve, so that as a result of the turbulence caused thereby only very inaccurate flow measurements are possible. Here, too, an interconnection or communication between the individual parts of the system with an external central control station is necessary. This variant only works when the valve is fully open and is therefore only suitable for on/off applications.

Figure 2:
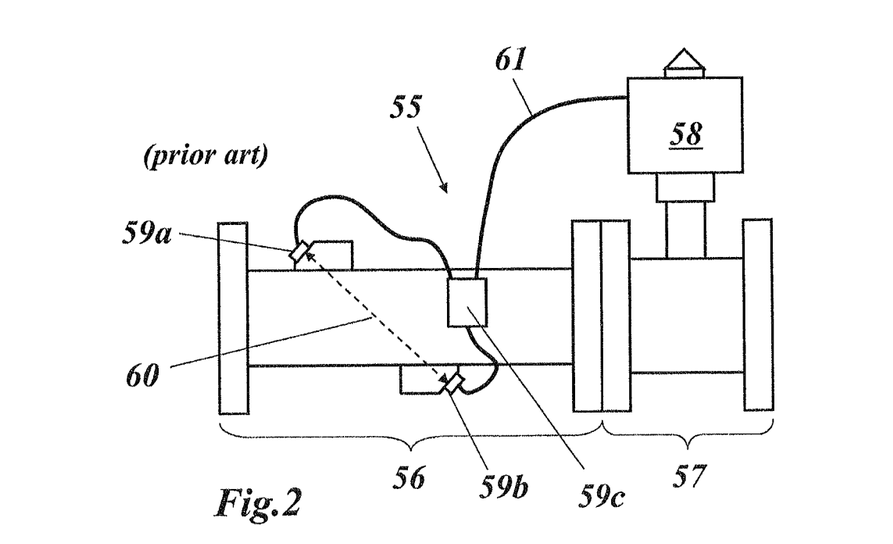
FIG. 2 a diagram of a second electronically controlled valve according to the prior art.

In addition, patent document US 2015/088321 A1 discloses a pressure-independent control valve system with a piping system for HVAC applications, as is shown in FIG. 2. The self-correcting control arrangement 55 of FIG. 2 is part of a pipe system that provides a flow path, which system comprises a separate measuring part 56 and a separate valve part 57 that can be connected to each other using appropriate flanges.

In the upstream end of the measuring part 56 of the control arrangement 55 a flow chamber is implemented, through which the flow medium passes. Here, staggered ultrasonic transducers 59a and 59b define a measuring path 60, with which the flow rate can be measured. At the downstream end of the control arrangement 55 the valve part 57, which can be designed, for example, as a flap valve, controls the flow by means of control and drive electronics 58. The transducers 59a and 59b are connected by wiring 61 to an ultrasound control and evaluation electronics 59c, as are the control and drive electronics 58 of the valve part 57.

A disadvantage of this solution is that the measurement and valve parts are separate pipe elements which must first be connected to each other at the flange connections at the assembly stage. The external wiring required on site is also time-consuming, as well as complicated and error-prone.

DESCRIPTION OF THE INVENTION

It is an object of the invention therefore to create an electronic flow controller which avoids the disadvantages of known regulated control valves and is characterized by robustness, accuracy, compactness and simplicity of application.

The object is achieved by the features of claim 1.

The invention is based on an electronic flow controller for applications in the HVAC field, which comprises a one-piece valve body that is penetrated by a flowing medium and is sub-divided along the flow direction into a valve portion and a flow measuring portion, wherein in the valve portion a valve element is arranged to control the flow rate, which can be actuated from the outside via a valve spindle, and wherein in the flow measuring portion a measuring path is formed for determining the flow rate by means of ultrasound.

It is characterized by the fact that on the valve body in the region of the flow measuring portion, access ports are formed for coupling in or extracting ultrasound into or out of the measuring path, and that a control unit is mounted on the valve body comprising first means for actuating the valve element, said means being in engagement with the valve spindle, and second means for transmitting and receiving ultrasonic signals, said means being acoustically coupled to the access ports for coupling in or extracting ultrasound.

An embodiment of the invention is characterized in that the valve spindle and the access ports for coupling in or extracting ultrasound are arranged on one side of the valve body, and that the control unit is mounted on the valve body on this side.

In this case, the valve spindle and the access ports for coupling in or extracting ultrasound are arranged in a line oriented parallel to the flow direction.

Another embodiment of the invention is characterized in that for determining the flow rate by means of ultrasound, the measuring path is oriented parallel to the flow direction in the flow measuring portion.

In this case, the flow direction can be constant in the flow measuring portion, the ultrasound can be coupled into or out of the measuring path transverse to the measuring path, and for the coupling in or out, redirection elements arranged at the beginning and end of the measuring path are provided in the flow measuring portion.

Also, the flow cross-section in the flow measuring portion can be reduced in the area of the measuring path.

Alternatively, the flow direction in the flow measuring portion can follow a U-shaped course, in which in a first sub-section the flow runs perpendicular to the main flow direction defined by the valve, in a second sub-section parallel to the main flow direction and in a third sub-section runs perpendicular to the main flow direction again, wherein the measuring path follows the U-shaped course of the flow, the ultrasound is coupled into the first or third sub-section or coupled out of the first or third sub-section transverse to the main flow direction, and wherein redirection elements are formed at the transitions between the first and second sub-section and the second and third sub-section.

In principle, provision can be made for all types of valves, such as a globe valve, cylinder valve, throttle valve, butterfly, diaphragm valve, slider valve, ball valve, or 6-way ball valve. An embodiment of the invention, however, is characterized in that the valve element is spherical in design.

Yet another embodiment of the invention is characterized in that in the control unit, the first means for actuating the valve element and the second means for transmitting or receiving ultrasonic signals are hard-wired to an electronic control system, thereby forming a control loop.

In this case a printed circuit board can be provided for the hard wiring.

A still further embodiment of the invention is characterized in that the control unit is accommodated in a closed housing.

A further embodiment of the invention is characterized in that the access ports on the valve body for coupling ultrasound into or out of the measuring path are implemented as laterally exiting flanges.

A further embodiment of the invention, which can be used as a so-called "energy valve", is characterized by the fact that third means are provided for measuring the temperature of the medium flowing through the control valve.

The third means may be arranged in the valve portion of the control valve.

In particular, the third means for contact-free temperature measurement may be formed on a part of the valve portion in thermal contact with the medium flowing through the control valve.

In this case, the third means comprise an infrared sensor, which is accommodated in the control unit, wherein the part in thermal contact with the medium flowing through the control valve is the valve spindle of the valve portion protruding into the control unit.

In addition, the infrared sensor can be arranged a distance above the free end of the valve spindle, wherein to bridge the gap the valve spindle is lengthened with a spindle extension.

In particular, the spindle can be mounted in the control unit, wherein to improve the thermal contact, the spindle extension is pressed with spring tension against the free end of the valve spindle.

BRIEF EXPLANATION OF THE DRAWINGS

The invention will be explained in detail below on the basis of exemplary embodiments and in conjunction with the drawing. Shown are.

MEANS OF EMBODYING THE INVENTION

Figure 3:
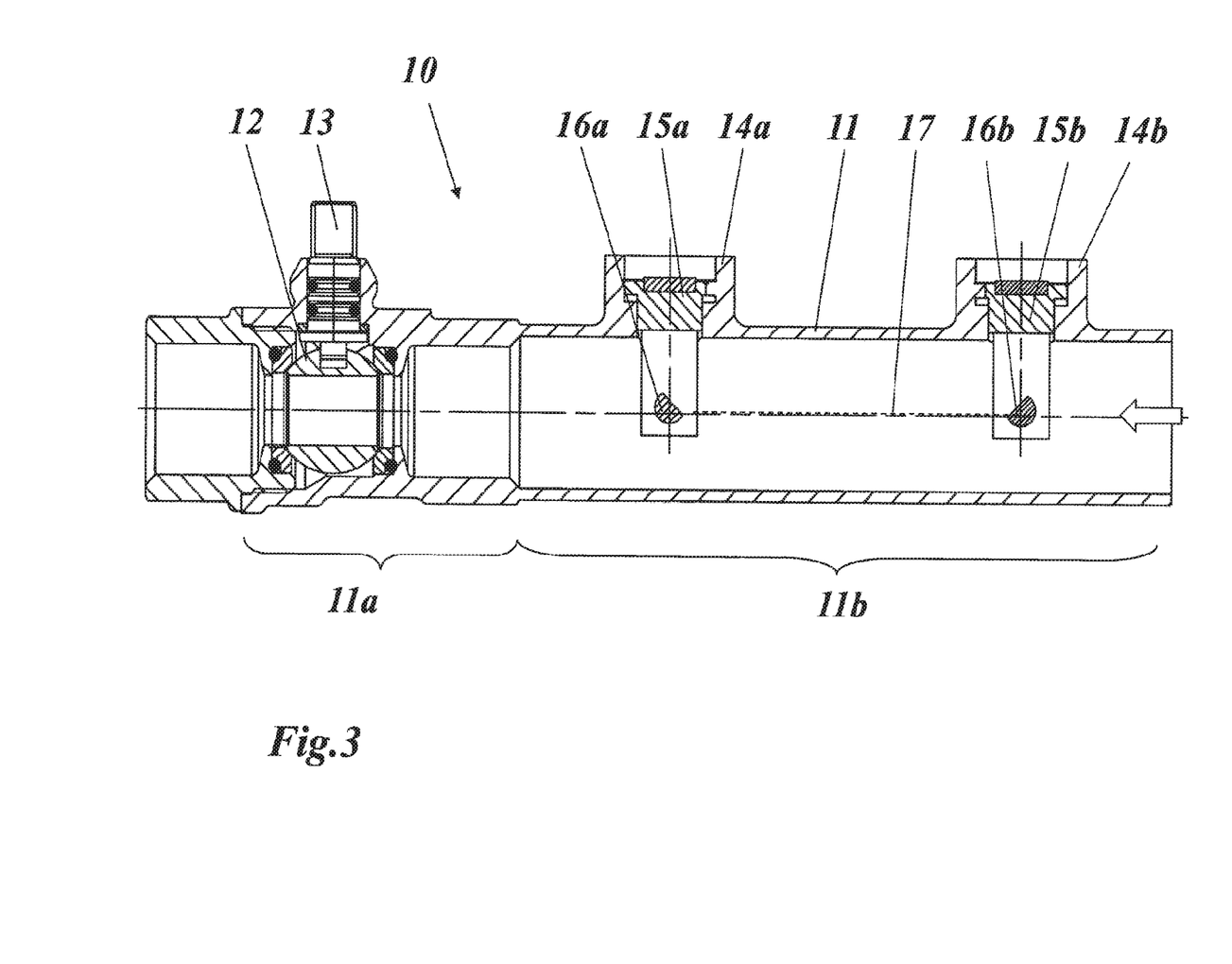
FIG. 3 a longitudinal section through an electronic flow controller in accordance with an exemplary embodiment of the invention (without the associated attachable control unit)

FIG. 3 shows a longitudinal section through an electronic flow controller in accordance with an exemplary embodiment of the invention, wherein the drive, measurement and control electronics has been omitted for the sake of clarity. The control valve 10 of FIG. 3 has a one-piece valve body 11, which is produced, for example, as a metallic cast or forged part and can be divided along the flow direction into a valve portion 11a and a flow measuring portion 11b.

In the valve portion 11a in this example, a ball valve is formed with a rotatably mounted, spherical valve element 12, which can be rotated by means of a valve spindle that is guided outwards for controlling the flow through the valve body 11. Such a valve is known, for example, from WO 2014/198367 A1. Other types of valves, such as flap valves are also equally possible in the valve portion 11a, however.

The flow measuring portion 11b in the example of FIG. 3 is designed as a straight continuous length of pipe with a constant inner diameter. A measuring path 17 extending parallel to the flow direction, which is centrally arranged in the flow measuring portion 11b, extends between two redirection elements 16a and 16b spaced apart in the pipe longitudinal direction for the ultrasound which propagates in the pipe. On this measuring path 17 the differences in sound propagation with the flow and against the flow can be determined and evaluated in a known manner. The ultrasound necessary for this is coupled in and/or out transverse to the flow direction by means of two measurement flanges 14a and 14b formed on the valve body 11, through openings 15a and 15b arranged therein. The necessary transducers are accommodated in a control unit (62 in FIG. 5) that can be attached to the valve body 11, which is omitted in FIG. 3.

With a valve arrangement according to FIG. 3, in the flow measuring section 11b the flow rate, which is proportional to the flow velocity, is continuously or periodically measured. The measurement values are evaluated in a set of electronics housed in the control unit and converted into control signals for the valve drive, also housed in the control unit, if the flow deviates from a pre-set desired value. Since the flow measuring portion 11b in FIG. 3 is very long and the measuring path 17 is therefore far away from the valve portion 11a, the influence of the valve on the uniformity of the flow is small, which improves the measurement and control accuracy.

Figure 4:
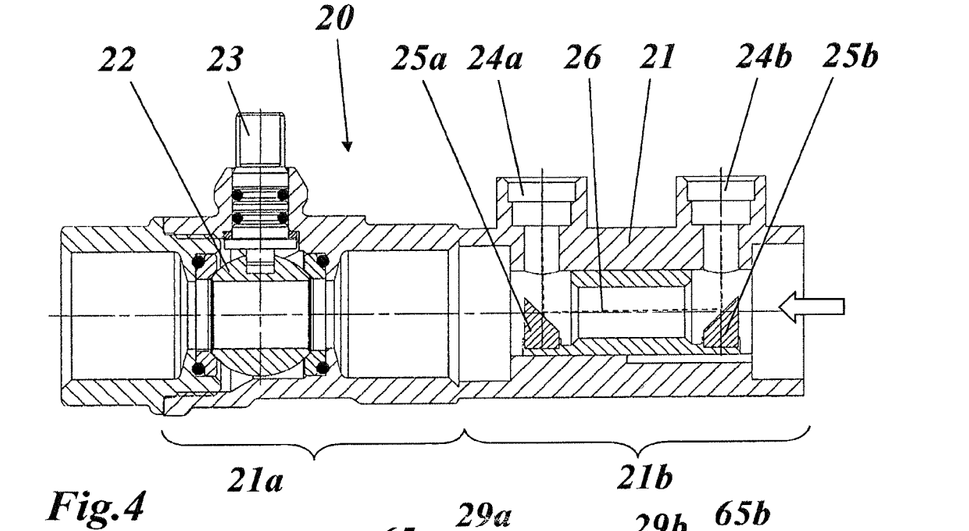
FIG. 4 a longitudinal section through an electronic flow controller in accordance with another exemplary embodiment of the invention (without the associated attachable control unit)

In the exemplary embodiment of FIG. 4 the valve body 21 of the valve 20 is shown compressed in the longitudinal direction, which is achieved in particular by the shortening of the flow measuring portion 21b relative to the valve portion 21a. The measuring path 26 formed between the redirection elements 25a and 25b is correspondingly shorter. On the other hand, the internal diameter in the region of the measuring path 26 is significantly reduced, so that a higher flow velocity prevails there, which promotes more accurate measurements. For coupling and decoupling the ultrasound transverse to the flow direction, two measuring flanges 24a and 24b are again provided. The valve—as in FIG. 3—is designed with a ball as the valve element 22 and a valve spindle 23. As shown in FIG. 3, valve spindle 23 and measuring flanges 24a and 24b are located on the same side of the valve body 21, in particular in a line parallel to the flow direction.

Figure 5:
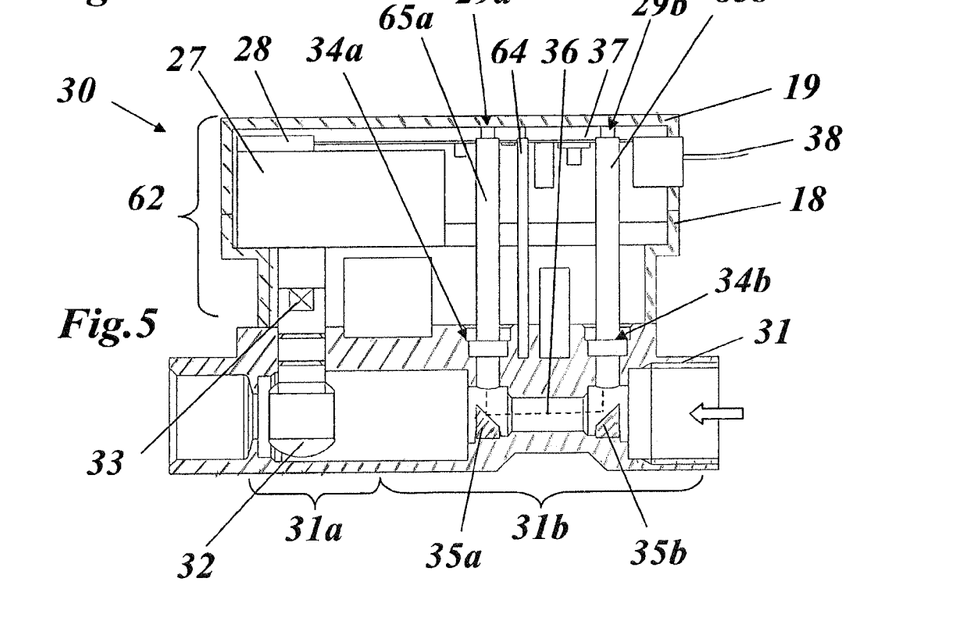
FIG. 5 a partial longitudinal section through an electronic flow controller in accordance with another exemplary embodiment of the invention with the associated mounted control unit.

The advantage of the compact, one-piece valve bodies 11 and 21 shown in FIG. 3 and FIG. 4 for the overall arrangement is clear from the example shown in FIG. 5, in which the control valve 30 placed there is illustrated with the control unit 62 attached. The control valve 30 in turn has a one-piece valve body 31, which is sub-divided into a valve portion 31a and a flow measuring portion 31b. In the valve portion, as the valve element 32 a ball with a central passage is again rotatably mounted and adjustable via a valve spindle routed to the outside. In the (straight continuous) flow measuring portion 31b, in a sub-section with reduced diameter between two redirection elements 35a and 35b, an ultrasound measuring path 36 is formed parallel to the flow direction, into which ultrasound can be coupled in or out via two measuring flanges 34a and 34b.

The transducers 29a and 29b provided for the sending and receiving of ultrasonic signals are arranged on a printed circuit board (PCB) 37 in the control unit 62 and connected via pipe fittings 65a and 65b to the measuring flanges 34a and 34b. The printed circuit board 37, on which all electronic and electrical units and components for the ultrasonic measurement, control and regulation are housed and hardwired together, is fixed to the valve body 31 by means of a post-shaped fixing element 64. It is enclosed by a two-part housing that can be assembled from a lower housing part 18 and an upper housing part 19. With the mounting of the control unit 62 on the valve body 31, not only are the transducers 34a and 34b visually connected to the measuring path 36, but also a drive unit housed in the control unit 62 and consisting of a motor 28 and transmission 27 is brought into engagement with the valve spindle 33 of the valve. For supplying power to the control unit 62 and the control-engineering connection to a remote central control unit, a connection cable 38 is routed out of the control unit 62. Via the connection cable 38 (or by radio techniques, i.e. wirelessly), target values can be specified by the central control unit, which are then adjusted and maintained on-site by appropriate control.

In each of the exemplary embodiments of FIGS. 3-5, two redirection elements 16a,b, 25a,b and 35a,b are arranged, between which the measuring path is implemented. The redirecting elements may in some circumstances have a disruptive effect on the flow. To avoid this, within the context of the invention other arrangements for the ultrasonic measurement can be selected. One of these arrangements is realised in the exemplary embodiment of FIG. 6. Here, too, the control valve 40 again contains a single-piece valve body 41, which is divided into a valve portion 41a and a flow measuring portion 41b. In the valve portion 41a a valve body 42 is arranged such that it can be rotated and actuated by means of a valve spindle 43 routed to the outside.

Figure 6:
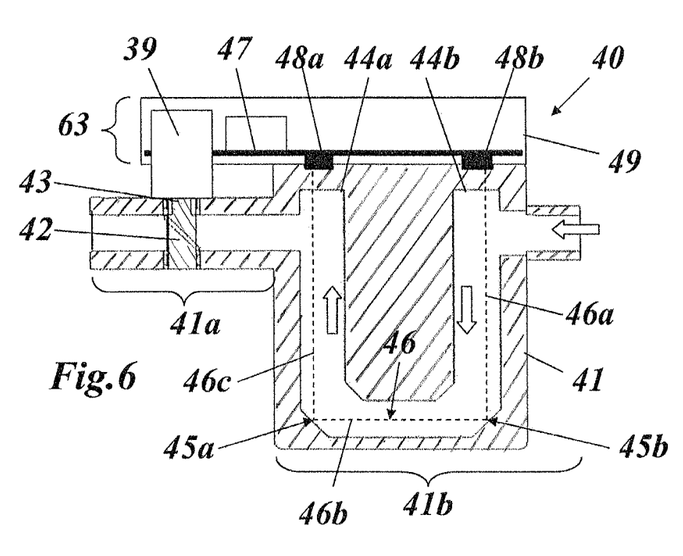
FIG. 6 in a simplified diagram a partial section of an electronic flow controller according to another different exemplary embodiment of the invention with a U-shaped redirection.

Unlike in the previous exemplary embodiments, here the flow direction in the flow measuring portion 41b is not straight, but follows a U-shaped course, in which in a first sub-section (measurement path section 41a) the fluid flow (with a virtually constant flow cross-section) runs perpendicular to the main flow direction defined by the valve, in a second sub-section (measurement path section 41b) parallel to the main flow direction and in a third sub-section (measurement path section 41c) perpendicular to the main flow direction again. The measuring path 46 with its measuring path sections 46a-c follows the U-shaped course of the fluid flow, wherein the ultrasound that is transmitted and/or received by the transducers 48a and 48b is coupled into the first or third sub-section or extracted from the first or third sub-section transverse to the main flow direction. For redirecting the ultrasound, between the sub-sections or measuring path portions 46a-c redirection elements 45a and 45b are formed at the transitions between the first and second sub-section and the second and third sub-section, in the form of bevelled corners.

In this way, a relatively long measurement path is provided while maintaining a compact structure of the arrangement, without the flow through the measuring arrangement being significantly disturbed.

Here, too, the control and regulation technology including the necessary valve actuator 39 is accommodated in a compact control unit 63 on a printed circuit board 47. The ultrasonic signals transmitted and/or received by the transducers 48a and 48b come from or reach the measurement path 46 via in-coupling apertures 44a and 44b.

The configurations and exemplary embodiments described up to now have been related to an electronically controlled pressure-independent valve of the EPIV type. If such a valve is to be used for measuring and controlling the energy delivered to a consumer (e.g. heat exchanger etc.), in addition to the measurement of the volume flow, the temperature of the medium before and after the consumer will also need to be measured. The valve then becomes an "energy valve". Such a valve collects and stores the consumption data of the water circuits in which it is used. An "energy monitoring" enabled by this provides the basis for monitoring and analysing hot- and cold-water circuits and optimising their energy use.

In addition, two temperature sensors are needed in order to measure the temperature in the supply and return lines. Since the valve is arranged in one of the pipes leading to or from the consumer, one of the temperature sensors can be integrated directly into the valve.

The data collected from the valve in this way also reveal changes in the system. Thus a plant can be monitored and performance reductions, caused for example by the contamination of a heat exchanger, can be identified and corrected. It is also possible to operate a heat exchanger constantly in the optimal range from an energy point of view and thus to ensure the value of equipment is maintained over its entire service life.

FIGS. 7 to 10 show an exemplary embodiment of a controlled pressure-independent valve that is based on the concept already explained, and in addition, provides a fully integrated temperature measurement. Here, for the sake of simplicity, only the valve portion 67 of the valve in which the temperature measurement is integrated is considered, and the flow measuring portion is omitted.

Figure 7:
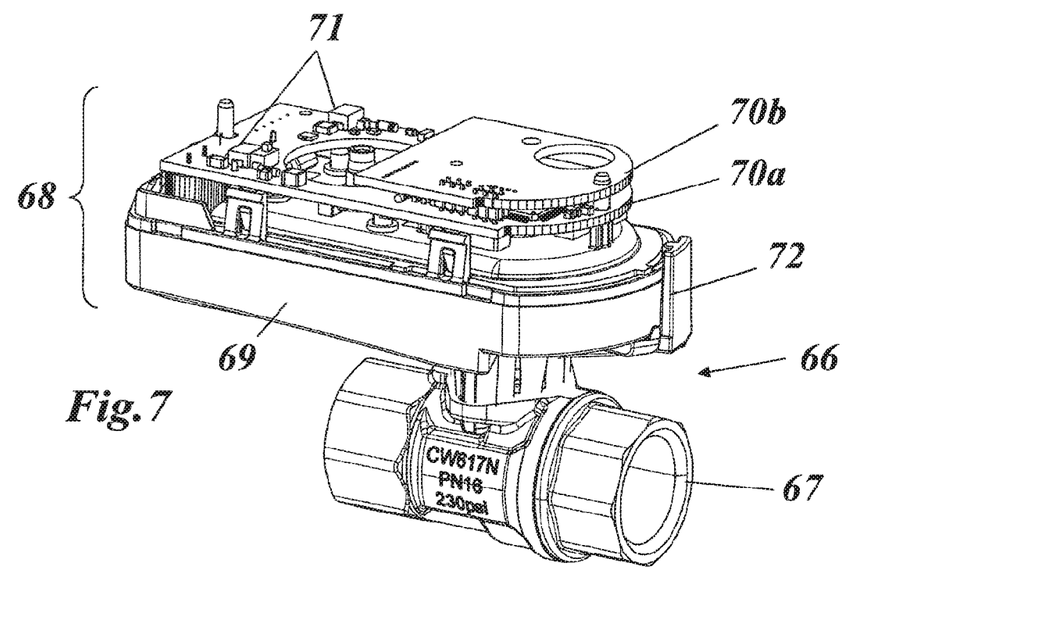
FIG. 7 the valve portion of an exemplary embodiment of an electronic flow controller, which is additionally equipped with means for measuring the temperature of the flowing medium and may be used as a so-called "energy valve"

FIG. 7 shows a perspective view of a valve portion 67 of a control valve 66 in the form of a ball valve with a mounted control unit 68, in the lower part 69 of which the drive mechanism for the valve is housed and which in the upper part contains the printed circuit boards (PCBs) 70a and 70b that are visible with the protective hood removed, on which different components 71 of the associated electronics are arranged and electrically interconnected. Also visible in FIG. 7 is a tappet 72, which is pivoted accordingly during adjustment of the valve and can be used to indicate and limit the valve position by means of an adjustable stop.

Figure 8:
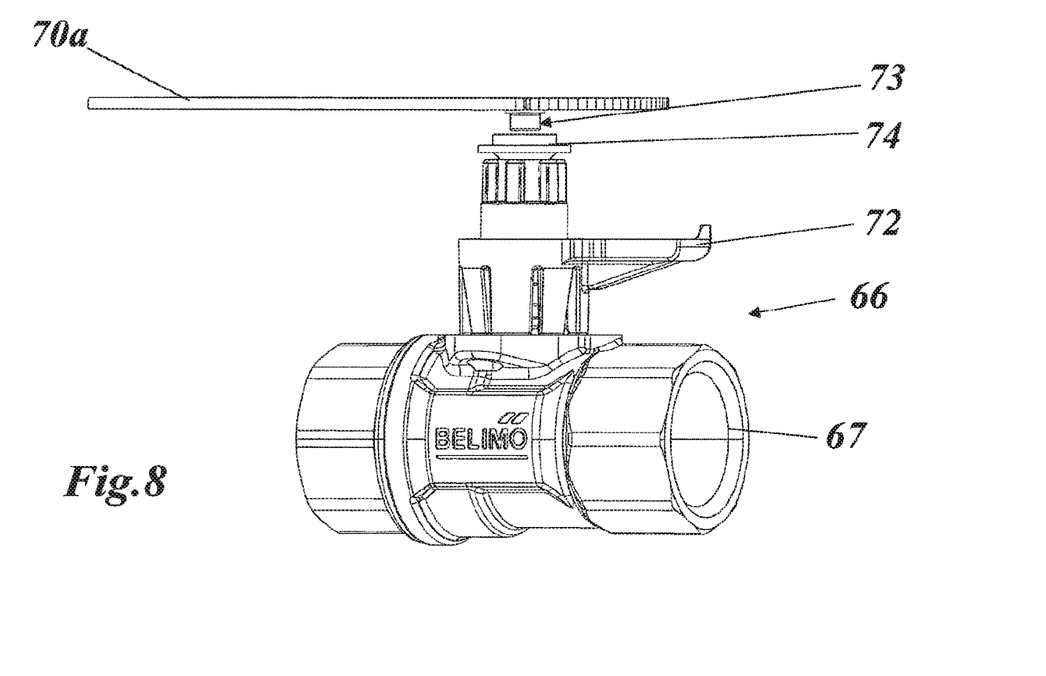
FIG. 8 in the valve portion in accordance with FIG. 7 after partial removal of the control unit, the infrared sensor used to measure temperature, which is arranged on the underside of a PCB mounted and scans the end face of a spindle extension mounted on the valve spindle.
Figure 9:
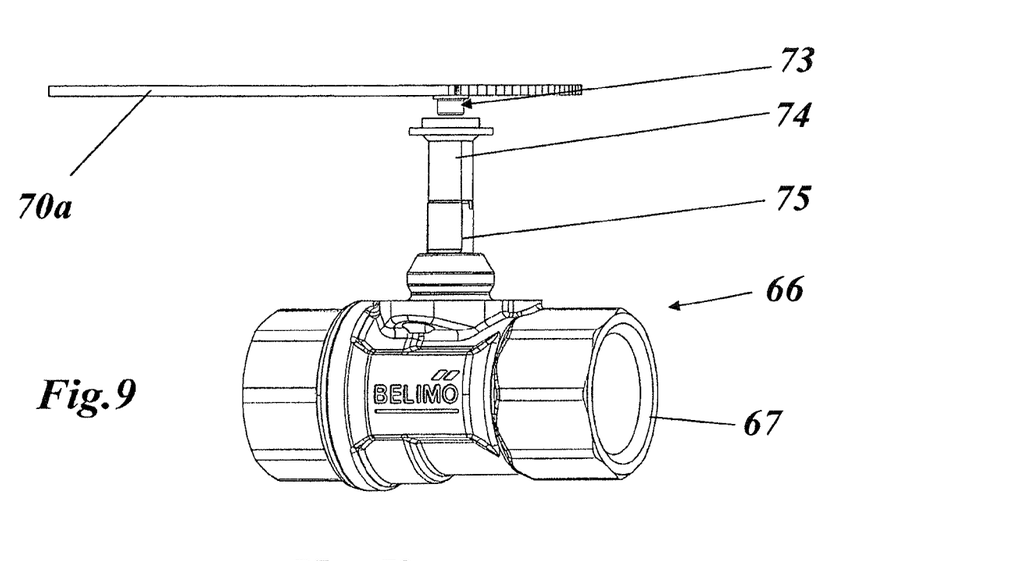
FIG. 9 the arrangement of FIG. 8 after removal of the tappet seated on the valve spindle.
Figure 10:
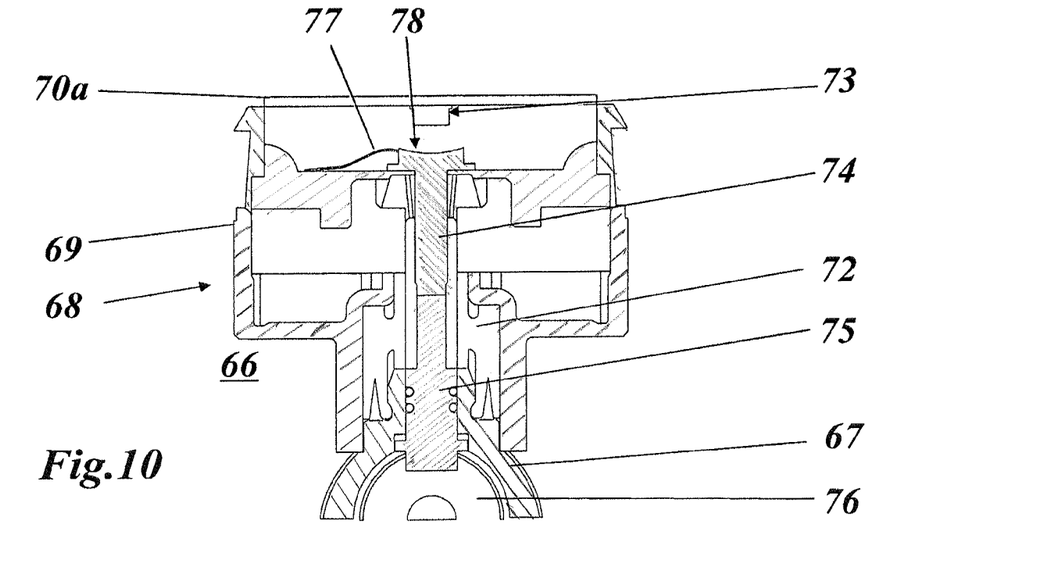
FIG. 10 a partial cross section through the spindle axis of the arrangement of FIG. 7.

In the simplified representation of FIG. 8, the only components shown are the valve portion 67, the tappet 72, a spindle extension 74 protruding past the top of the tappet and the printed circuit board 70a with an infrared sensor 73 arranged on the underside and with the optical opening directed onto the end face of the spindle extension 74. If the tappet 72 is omitted completely—as is the case in FIG. 9—the valve spindle 75 protruding out of the top of the valve body with the attached spindle extension 74 can also be seen.

The purpose of this arrangement is to transfer the temperature of the valve element in thermal contact with the flowing medium, in this case the valve ball (76 in FIG. 10), via solid-state thermal conduction of the valve spindle 75 and the spindle extension 74 connected thereto, into the upper front face of the spindle extension 74 with low loss, where it is then determined in a contactless manner via an infrared measurement by means of the infrared sensor 73.

Such an arrangement has the advantage that no wiring between the valve body and the electronics is necessary, such as is the case, e.g., with a temperature sensor inserted in the valve body. The inevitable temperature drop across the valve element, the valve spindle 75 and the spindle extension 74 can be reduced by an appropriate choice of material for the valve spindle 75 and the spindle extension 74 (good thermal conductivity) and by means of a calibration curve or chart, also taken into account and compensated for. Furthermore, the upper end face of the spindle extension 74—as is apparent in FIG. 10—can be matched to the opening angle of the infrared sensor 73 by appropriate curvature. Also, the end face can be coated with an infrared-emission enhancing emission layer 78. Finally, the solid-state contact between valve spindle 75 and spindle extension 74 can be reinforced by a contact pressure, which is generated by a leaf spring 77 or a comparable spring element pressing down on the spindle extension 74 from above. The spindle extension 74 is mounted in the control unit 68 and comes into contact with the valve spindle 75 when the control unit 68 is attached.

The integrated contactless temperature measurement can be used to determine one of the two temperatures. The other temperature is then determined via an external sensor, which is mounted on the other pipe and must be connected to the control unit 68.

By reference to FIGS. 7 to 10 the valve portion of a regulated control valve 66 with an integrated temperature measurement has been explained. However, it is also conceivable to provide such an integrated temperature measurement with an (unregulated) stand-alone valve, in particular a ball valve, without this needing to be directly combined with a flow measuring device. In this case, the control unit would be replaced by a control unit or an actuator, which activates the valve and at the same time can record the temperature of the medium flowing through the valve.

Such a control valve for applications in the HVAC field would comprise a valve body that is penetrated by a flowing medium, in which a valve element is arranged to control the flow rate, which can be actuated from the outside via a valve spindle, and a removable control unit is mounted on the valve body, which comprises first means for actuating the valve element, said means being in engagement with the valve spindle, as well as second means for measuring the temperature of the medium flowing through the control valve, wherein the second means for providing the contactless temperature measurement are formed on a part of the valve portion in thermal contact with the medium flowing through the control valve.

In particular, the second means could comprise an infrared sensor which is accommodated in the control unit, wherein the part in thermal contact with the medium flowing through the control valve is the valve spindle of the valve portion protruding into the control unit.

The infrared sensor could then be arranged a distance above the free end of the valve spindle, wherein to bridge the gap the valve spindle is lengthened with a spindle extension.

In particular, the spindle extension could be mounted in the control unit, wherein to improve the thermal contact the spindle extension is pressed with spring tension against the free end of the valve spindle.

REFERENCE LIST

10, 20 electronic flow controller
11, 21 valve body 11a valve portion
11b flow measuring portion
12, 22 valve element (e.g. ball)
13, 23 valve spindle
14a, b measurement flange
15a, b opening
16a, b redirection element
17, 26 measuring path
18 housing lower part
19 housing upper part
21a valve portion
21b flow measuring portion
24a, b measurement flange
25a, b redirection element
27 transmission
28 motor
29a, b transducer (ultrasound)
30, 40 electronic flow controller
31, 41 valve body
31a valve portion
31b flow measuring portion
32 valve element (e.g. ball)
33 valve spindle
34a, b measurement flange
35a, b redirection element
36 measuring path
37 printed circuit board (PCB)
38 connection cable
39 valve drive
41a valve portion
41b flow measuring portion
42 valve element (e.g. plate)
43 valve spindle
44a, b in-coupling opening
45a, b redirection element
46 measuring path
46a-c measuring path portion
47 printed circuit board (PCB)
48a, b transducer (ultrasound)
49 housing
50 electronic flow controller
51 valve body
51a, b connecting flange
52 valve element
52a actuating shaft
53 flow measurement device
54 motor
55 control arrangement
56 measurement part
57 valve part
58 control and drive electronics
59a, b transducer (ultrasound)
59c ultrasonic activation and evaluation electronics
60 measuring path
61 wiring
62, 63 regulation unit
64 fixing element
65a, b piece of pipe
66 control valve
67 valve portion (e.g. ball valve)
68 regulation unit
69 lower part
70a, b printed circuit board (PCB)
71 component
72 tappet (spindle)
73 infrared sensor
74 spindle extension
75 valve spindle
76 valve ball (valve element)
77 leaf spring
78 emission layer

The invention claimed is:

1. An electronic flow controller (10, 20, 30, 40, 66), having a control valve (66), structured to provide continuous control of a flow rate of a flow medium in a HVAC system, said controller comprising:
the control valve, said control valve having a one-piece valve body (11, 21, 31, 41) that is penetrated by the flow medium and is sub-divided along the flow direction into a valve portion (11a, 21a, 31a, 41a, 67) and a flow measuring portion (11b, 21b, 31b, 41b),
wherein in the valve portion (11a, 21a, 31a, 41a, 67) a valve element (12, 22, 32, 42, 76) is arranged to control the flow rate at variable amounts, which valve portion can be actuated from the outside via a valve spindle (13, 23, 33, 43, 75),
wherein in the flow measuring portion (11b, 21b, 31b, 41b) a measuring path (17, 26, 36, 46) is formed for determining measurement values of the flow rate by means of ultrasound,
wherein on the valve body (11, 21, 31, 41) in the region of the flow measuring portion (11b, 21b, 31b, 41b) access ports (14a,b, 15a,b, 24a,b 34a,b, 44a,b) are formed for coupling ultrasound into or extracting ultrasound out of the measuring path (17, 26, 36, 46),
wherein a control unit (62, 63, 68) is mounted on the valve body (11, 21, 31, 41), said control unit comprising first means (27, 28, 39) for actuating the valve element (12, 22, 32, 42, 76), said first means being in engagement with the valve spindle (13, 23, 33, 43, 75), and second means (29a, b, 48a, b) for transmitting and receiving ultrasonic signals that are acoustically coupled to the access ports (14a,b, 15a,b, 24a,b, 34a,b, 44a,b) for coupling ultrasound in or out of the measuring path, and
wherein the measurement values of the flow rate are evaluated by said control unit in a set of electronics and converted into control signals for providing a continuous and variable flow control of the first means based on a deviation of the flow rate from a pre-set desired value.

2. The electronic flow controller according to claim 1, characterized in that the valve spindle (13, 23, 33, 43, 75) and the access ports (14a, b, 15a, b, 24a, b, 34a, b, 44a, b) for coupling in or extracting ultrasound are arranged on one side of the valve body (11, 21, 31, 41), and that the control unit (62, 63, 68) is mounted onto the valve body (11, 21, 31, 41) on this side.

3. The electronic flow controller according to claim 2, characterized in that the valve spindle (13, 23, 33, 43, 75) and the access ports (14a,b, 15a,b, 24a,b, 34a,b, 44a,b) for coupling in or extracting ultrasound are arranged in a line oriented parallel to the flow direction.

4. The electronic flow controller according to claim 1, characterized in that the measuring path (17, 26, 36, 46) for determining the flow rate by means of ultrasound is oriented parallel to the flow direction in the flow measuring portion (11b, 21b, 31b, 41b).

5. The electronic flow controller according to claim 4, characterized in that the flow direction in the flow measuring portion (11b, 21b, 31b) is constant, that the ultrasound is coupled into the measuring path (17, 26, 36) or extracted from the measuring path (17, 26, 36) transverse to the measurement path (17, 26, 36), and that for coupling in or out, redirection elements (16a, b, 25a, b, 35ba, b) arranged at the beginning and end of the measuring path (17, 26, 36) are provided in the flow measuring portion (11b, 21b, 31b).

6. The electronic flow controller according to claim 5, characterized in that the flow cross-section in the flow measuring portion (21b, 31b) is reduced in the region of the measuring path (26, 36).

7. The electronic flow controller according to claim 4, characterized in that the flow direction in the flow measuring portion (41b) follows a U-shaped course, in which the flow in a first sub-section runs perpendicular to the main flow direction defined by the valve, in a second sub-section parallel to the main flow direction and in a third sub-section runs perpendicular to the main flow direction again, that the measuring path (46) follows the U-shaped course of the flow, that the ultrasound is coupled into the first or third sub-section or extracted from the first or third sub-section transverse to the main flow direction, and that redirection elements (45a, b) are formed at the transitions between the first and second sub-section and the second and third sub-section.

8. The electronic flow controller according to claim 1, characterized in that the valve element (12, 22, 32, 76) is spherically shaped.

9. The electronic flow controller according to claim 1, characterized in that in the control unit (62, 63, 68) the first means (27, 28, 39) for actuating the valve element (12, 22, 32, 42) and the second means (29a,b, 48a,b) for transmitting or receiving ultrasonic signals are hard-wired to an electronic control circuit, thereby forming a control loop.

10. The electronic flow controller according to claim 9, characterized in that for the hard-wiring a printed circuit board (37, 47, 70a, 70b) is provided.

11. The electronic flow controller according to claim 1, characterized in that the control unit (62, 63) is accommodated in a closed housing (18, 19, 49, 69).

12. The electronic flow controller according to claim 1, characterized in that the access ports (14a,b, 15a,b, 24a,b, 34a,b) on the valve body (11, 21, 31, 41), for coupling ultrasound into or out of the measuring path (17, 26, 36) are implemented as laterally exiting flanges.

13. The electronic flow controller according to claim 1, characterized in that third means (73, 74) are provided for measuring the temperature of the medium flowing through the valve body.

14. The electronic flow controller according to claim 13, characterized in that the third means (73, 74) are arranged in the valve portion (67) of the control valve (66).

15. The electronic flow regulator according to claim 14, characterized in that the third means (73, 74) for providing temperature measurement are formed on a part (75) of the valve portion (67) in thermal contact with the medium flowing through the control valve (66).

16. The electronic flow controller according to claim 15, characterized in that the third means (73, 74) comprise an infrared sensor (73) which is accommodated in the control unit (68), and that the part in thermal contact with the medium flowing through the control valve (66) is the valve spindle (75) of the valve portion (67) protruding into the control unit (68).

17. The electronic flow controller according to claim 16, characterized in that the infrared sensor (73) is arranged at a distance above the free end of the valve spindle (75), and that in order to bridge the gap, the valve spindle (75) is lengthened with a spindle extension (74).

18. The electronic flow controller according to claim 17, characterized in that the spindle extension (74) is mounted in the control unit (68), and that to improve the thermal contact the spindle extension (74) is pressed against the free end of the valve spindle (75) under spring tension.

* * * * *